US007021186B2

(12) United States Patent
Brazell et al.

(10) Patent No.: US 7,021,186 B2
(45) Date of Patent: Apr. 4, 2006

(54) BEVEL ADJUSTMENT MECHANISM FOR A COMPOUND MITER SAW

(75) Inventors: Kenneth M. Brazell, Piedmont, SC (US); Peter Jon Shigo, Mesa, AZ (US)

(73) Assignee: Eastway Fair Company Limited, Tortola (VG)

( * ) Notice: Subject to any disclaimer, the term of this patent is extended or adjusted under 35 U.S.C. 154(b) by 0 days.

(21) Appl. No.: 10/214,531

(22) Filed: Aug. 8, 2002

(65) Prior Publication Data

US 2003/0110914 A1 Jun. 19, 2003

Related U.S. Application Data

(60) Provisional application No. 60/311,469, filed on Aug. 10, 2001.

(51) Int. Cl.
*B27B 5/20* (2006.01)

(52) U.S. Cl. ...................... 83/471.3; 83/473; 83/477.1; 83/490; 83/581

(58) Field of Classification Search ............... 83/471.3, 83/477.1, 581, 473, 486.1, 472, 477, 522.15, 83/490

See application file for complete search history.

(56) References Cited

U.S. PATENT DOCUMENTS 4,452,117 A * 6/1984 Brickner et al. .............. 83/468
4,875,399 A * 10/1989 Scott et al. ................ 83/468.3
5,042,348 A 8/1991 Brundage et al.
5,235,889 A * 8/1993 Brickner et al. ........... 83/471.3
D346,173 S * 4/1994 Price ......................... D15/133
5,623,860 A 4/1997 Schoene et al.
5,778,747 A * 7/1998 Chen ......................... 83/471.3
5,802,943 A 9/1998 Brunson et al.
5,829,333 A 11/1998 Itzov
5,862,734 A 1/1999 Brunson et al.
5,870,938 A 2/1999 Brunson et al.
5,907,987 A 6/1999 Stumpf et al.
5,988,031 A * 11/1999 Wixey ....................... 83/471.3
6,032,562 A 3/2000 Brunson et al.
6,032,563 A 3/2000 Stumpf et al.
6,035,754 A 3/2000 Stumpf et al.
6,067,885 A 5/2000 Brunson et al.
D428,426 S * 7/2000 Brazell ...................... D15/133
6,101,914 A 8/2000 Brunson et al.
6,142,051 A 11/2000 Garuglieri
6,173,635 B1 * 1/2001 Chang ....................... 83/471.3
6,397,716 B1 6/2002 Garuglieri
6,474,207 B1 11/2002 Itzov
6,520,059 B1 2/2003 Stumpf et al.
2001/0042429 A1 11/2001 Brunson et al.

* cited by examiner

*Primary Examiner*—Stephen Choi
(74) *Attorney, Agent, or Firm*—Brinks Hofer Gilson & Lione

(57) ABSTRACT

A compound miter saw having a bevel adjustment mechanism for adjusting the angle of inclination of a cutting disk relative to a top surface of a turntable. The bevel adjustment mechanism includes a first knuckle for adjusting the angle of inclination of the cutting disk about a tilt axis and a second knuckle for adjusting the upward and downward movement of the cutting disk. The first knuckle includes a fixed portion mounted adjacent the outer periphery of the turntable and a rotating portion cooperating with the fixed portion. A scale and indicator are provided on the fixed and rotating portions to measure the angle of inclination of the saw assembly relative to the tilt axis. A locking mechanism secures the rotating portion to the fixed portion to secure the saw in a cutting position.

15 Claims, 5 Drawing Sheets

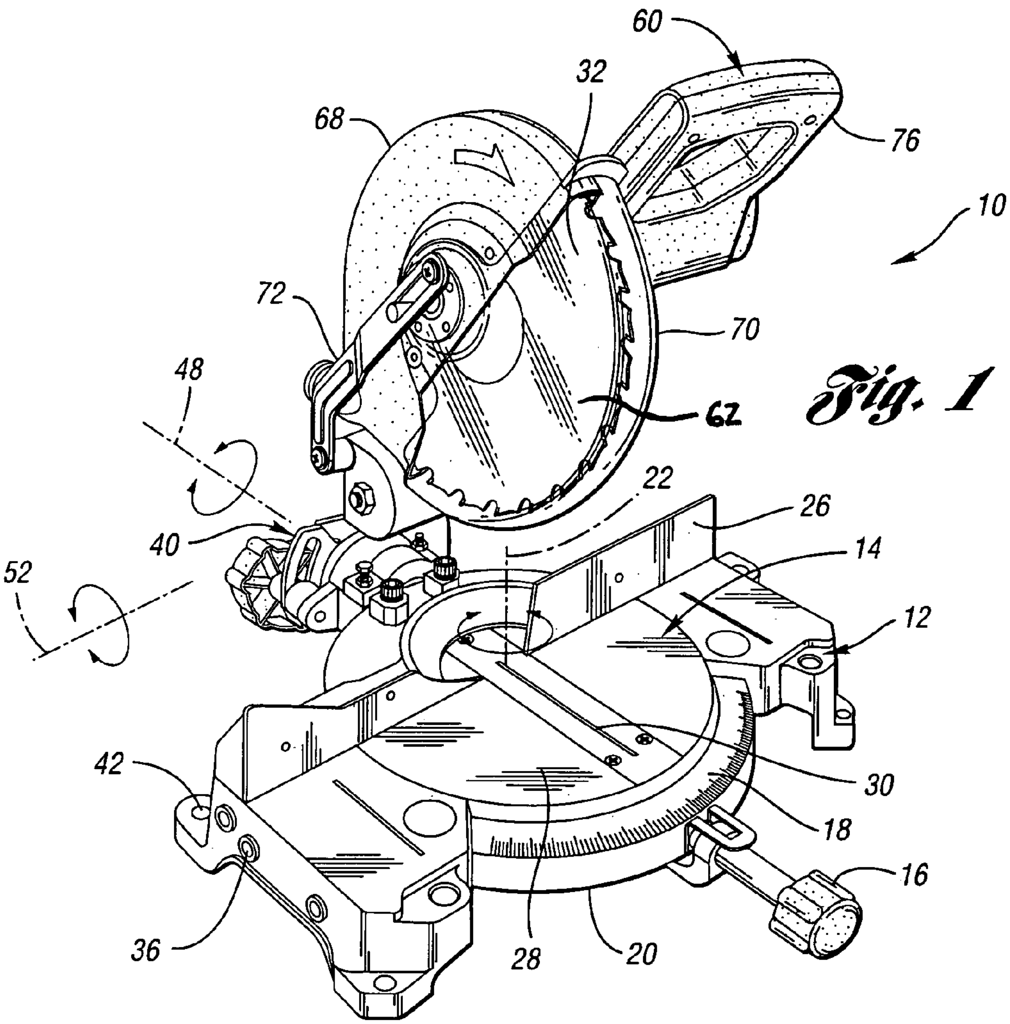
Fig. 1
Fig. 2
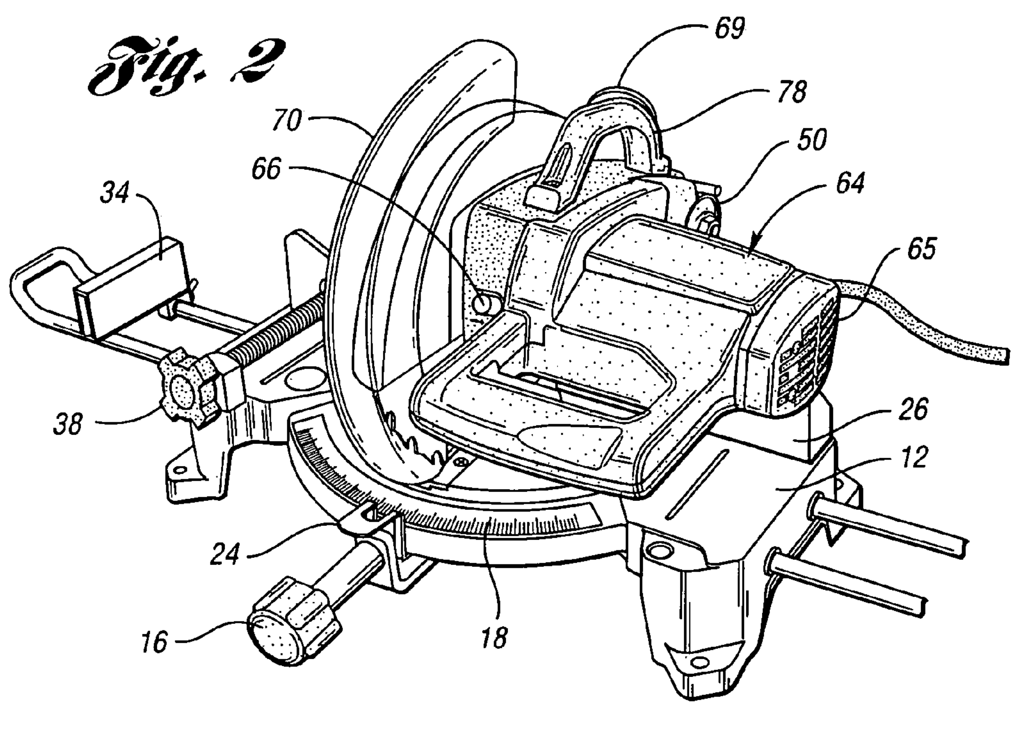

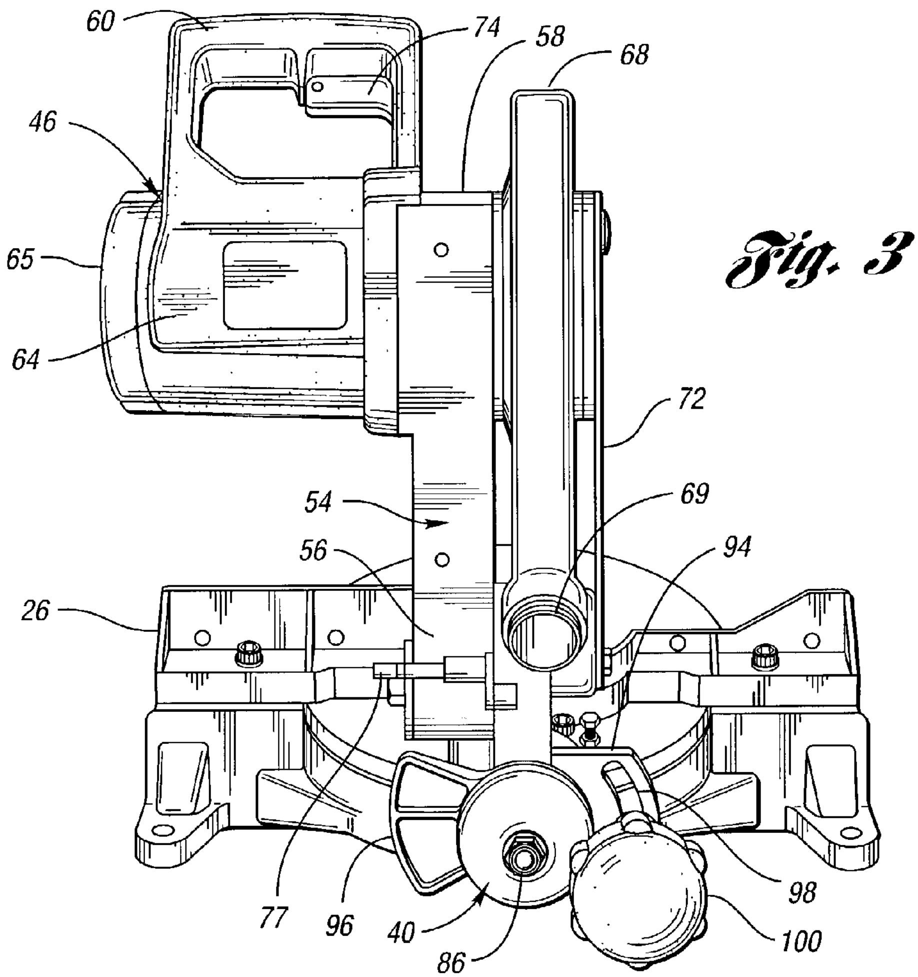
Fig. 3
Fig. 4
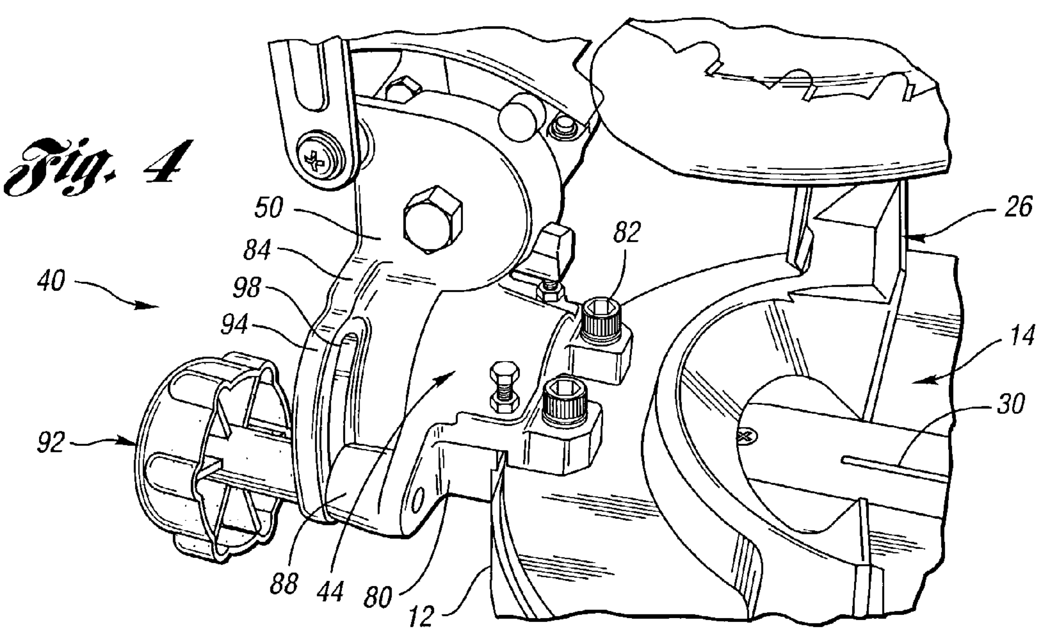

BEVEL ADJUSTMENT MECHANISM FOR A COMPOUND MITER SAW

CROSS-REFERENCE TO RELATED APPLICATIONS

This application claims the benefit of U.S. provisional application Ser. No. 60/311,469 filed Aug. 10, 2001.

TECHNICAL FIELD

The present invention relates to a compound miter saw and in particular to a bevel adjustment mechanism for a compound miter saw.

BACKGROUND ART

Miter saws are used to cut wood and other materials at precise angles. For example, compound miter saws are used to cut crown moldings, cove moldings, and other trim pieces and structural members at single or compound angles. Compound miter saws generally have a circular saw blade that is rotated at a high rate of speed to cut a workpiece. The blade is guarded by a retractable blade guard that covers the saw blade but is retracted as the blade is brought into contact with a workpiece. The workpiece is generally retained on a supporting table that, in conjunction with a fence, is used to position the workpiece for cutting by the saw blade.

Many prior art compound miter saws include a pivot arrangement allowing the adjustment of a saw blade through both a horizontal and a vertical plane. A typical pivot arrangement includes a first knuckle which pivotally connects an arm having a saw blade and a motor driving the saw blade mounted to the arm to a turntable. The first knuckle permits the saw blade to move towards and away from the turntable through a vertical plane. A second knuckle allows the the saw blade to be inclined at an angle relative to the top surface of the turntable to make a miter cut in the workpiece. Although compound miter saws are very effective in making miter and compound miter joints, the joint cuts are often imprecise and not sufficiently repeatable for detailed works, such as for fine furniture or cabinetry work. Additionally, the position locking mechanisms of many current compound miter saw pivot arrangements do not sufficiently lock the saw assembly in a cutting position, which can lead to imprecise cuts or even possible injury to the operator.

Accordingly, it is an object of the present invention to provide a compound miter saw having a bevel adjustment mechanism which improves the cutting accuracy of the saw blade. It is another object of the invention to provide a compound miter saw having a bevel adjustment mechanism which locks the saw assembly in position during the cutting operation. It is a further object of the invention to provide a compound miter saw having a bevel adjustment mechanism which includes a direction indicator to assist the operator in determining the angular position of the saw blade during the cutting operation.

DISCLOSURE OF INVENTION

Accordingly, a compound miter saw of the present invention includes a base, a turntable rotatably mounted to the base having a planar upper surface and a fence assembly affixed to the base. A saw assembly is pivotally mounted to the turntable. The saw assembly includes an elongate arm having a fixed end pivotally attached to the turntable, a distal end forming a handle and a central region therebetween. A motor assembly is disposed on the elongate arm and includes a rotary spindle, a cutting disk mounted on the rotary spindle. A motor is disposed within the housing and is operatively connected to the rotary spindle.

A bevel adjustment mechanism is provided for adjusting the angle of inclination of a cutting disk relative to a top surface of a turntable. The bevel adjustment mechanism includes a first knuckle for adjusting the angle of inclination of the cutting disk about a tilt axis and a second knuckle for adjusting the upward and downward movement of the cutting disk. The first knuckle includes a fixed portion mounted to the turntable adjacent with the outer periphery having a locking flange extending radially outward of the tilt axis. A rotatable portion having a first flange with an arcuate channel spaced radially outward of the tilt axis and an opposing second flange having a scale provided thereon cooperates with the fixed portion. A locking mechanism extends through the arcuate channel in the flange of the rotatable portion into a passage in the locking flange of the fixed portion to secure a saw assembly in position.

These and other aspects of the invention and advantages of the invention over the prior art will be better understood in view of the attached drawings and following detailed description provided below.

BRIEF DESCRIPTION OF THE DRAWINGS

FIG. 1 is a perspective view of a compound miter saw of the present invention;

FIG. 2 is a perspective view of the compound miter saw of the present invention in the cutting position;

FIG. 3 is a rear plan view of the compound miter saw of the present invention;

FIG. 4 is a side perspective view of the bevel adjustment mechanism of the compound miter saw of the present invention;

BEST MODE FOR CARRYING OUT THE INVENTION

Figure 5:
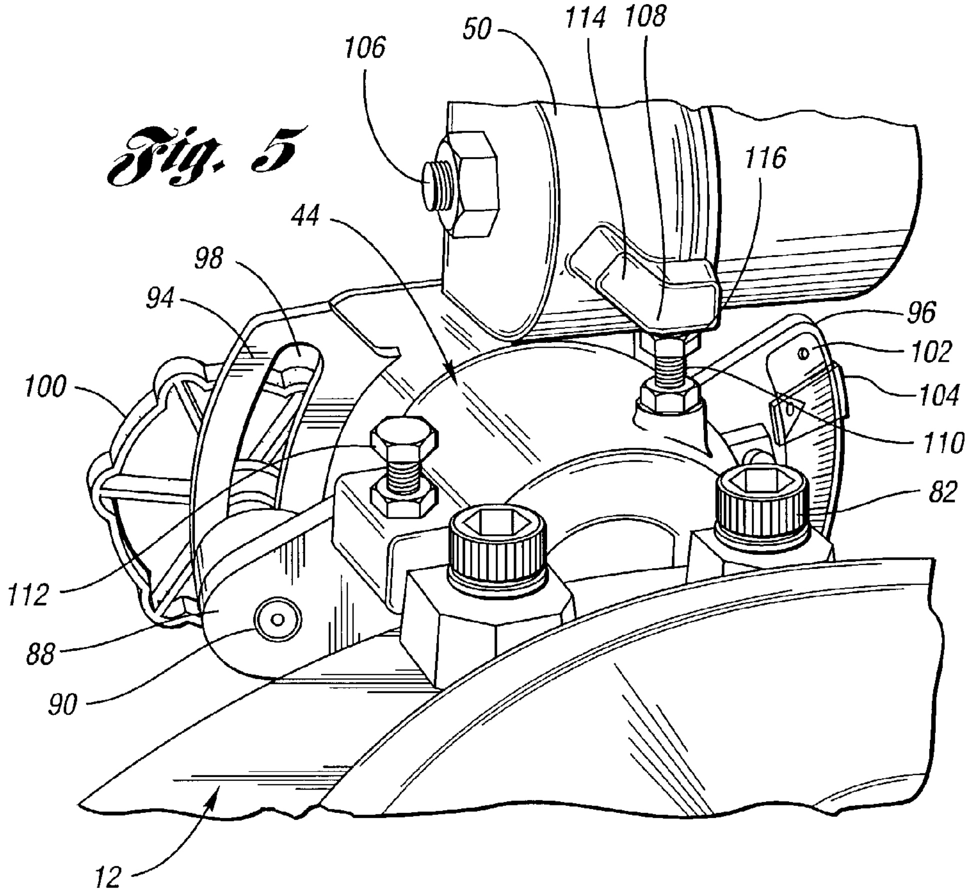
FIG. 5 is a perspective view of the bevel adjustment mechanism of the compound miter saw of the present invention.

Referring to FIGS. 1 and 2, a compound miter saw 10 according to the present invention comprises a support member or base 12 having a circular turntable 14 rotatably mounted thereon. Base 12 and turntable 14 collectively define on their upper surface a generally planar work support surface. A miter lock handle 16 extends radially from one end of the turntable 14 to lock the turntable to the base 12 at a desired position. A scale 18 is provided on an outer edge 20 of the base 12 to measure the rotational position of the turntable about a generally vertical axis 22. Turntable 14 is rotated relative to the base 12 about axis 22 by releasing and relocking miter lock handle 16 permits an operator to rotate turntable 14 relative to the base 12 to a desired position about axis 22. An indicator 24 on miter lock handle 16 extends towards scale 18 to provide the rotational position of the turntable 14 relative to the base 12.

A fence assembly 26 secured to the base 12 extends across a top surface 28 of turntable 14 to provide a vertical support surface against which a workpiece is located when the workpiece is cut on the miter saw 10. A saw blade slot 30 is formed through the top surface 28 of turntable 14 adjacent fence assembly 26 to receive a saw blade 32 during the cutting operation. Workpiece support extensions 34 are removably mounted to the each side of the base through holes 36 to provide additional support to a workpiece during the cutting operation. A clamp 38 may be mounted on the base 12 opposite fence assembly 26 to secure the workpiece in position during the cutting operation.

A bevel adjustment mechanism 40 secured to the top surface 28 of turntable 14 extends outward beyond the rear periphery 42 of the base 12. Bevel adjustment mechanism 40 includes a first knuckle 44 for pivotally adjusting a saw assembly 46 about a tilt axis 48 and a second knuckle 50 for pivotally adjusting the arm assembly about a pivot axis 52 to cause the saw blade 32 to plunge into the workpiece to be cut. A description of the operation of the bevel adjustment mechanism 40 of compound miter saw 10 will be discussed in greater detail below.

Referring additionally now to FIG. 3, saw assembly 46 includes an elongate arm 54 having a fixed end 56 pivotally attached to the second knuckle 50 of bevel adjustment mechanism 40 and an opposing distal end 58 terminating at a handle 60. A rotary cutting disk 62 is connected to arm 54 by a rotary spindle (not shown). As is best shown in FIG. 1, rotary cutting disk 62 is typically a circular saw blade or alternatively, an abrasive wheel, releasably secured to the rotary spindle. An electric motor disposed in motor housing 64 is operatively connected to rotary cutting disk 62 through rotary spindle and drives rotary spindle via a conventional gear reduction mechanism. A motor cap 65 is provided on an end of the motor housing 64 opposite the saw blade 32. A shaft lock 66 is provided on the motor housing 64 to lock rotary spindle during a saw blade change.

An upper blade guard 68 is rigidly attached to the arm 54 to enclose the upper half of the cutting disk 62. A dust collection port 69 is integrally formed in the upper blade guard 68 adjacent the fixed end 56 of arm 54 to discharge material removed from the workpiece during the cutting operation. A lower blade guard 70 is pivotally mounted to the upper blade guard 68 by a pivot arm 72 extending from the second knuckle 50. The lower blade guard 70 is retracted as saw assembly 46 is pivoted downward toward turntable 14, allowing saw blade 32 to contact the workpiece for the cutting operation.

Handle 60 of saw assembly 46 is provided at the distal end 58 of arm 54. In a preferred embodiment of the invention shown in the FIGS., handle 60 comprises a "D" shaped handle integrally formed with and extending from the motor housing 64. Handle 60 includes a trigger 74 oriented to be proximate the operator's index finger and a palm grip portion 76. To perform the cutting operation, the operator grasps handle 60 and turns on the saw by depressing trigger 74 to cause the motor to rotate the cutting disk 62 on the rotary spindle. It should be understood that a variety of handle arrangements may be incorporated with the compound miter saw 10 of the present invention, such as a conventional "pistol grip" handle arrangement provided at the distal end 58 of arm 54.

Compound miter saw 10 is shown in the lowered or cutting position in FIG. 2. Saw assembly 46 is biased between the lowered or cutting position and a raised position by a torsional spring disposed in second knuckle 50 such that the rotary cutting disk 62 is spaced above the upper surface of turntable 14. A pin 77 is biased between an unlocked position and a locked position extending through the second knuckle 50 to lock the saw assembly 46 in the cutting position for transportation. A handle 78 is provided on the upper surface of arm 54 to allow an operator to transport the compound miter saw 10 between locations.

Figure 6:
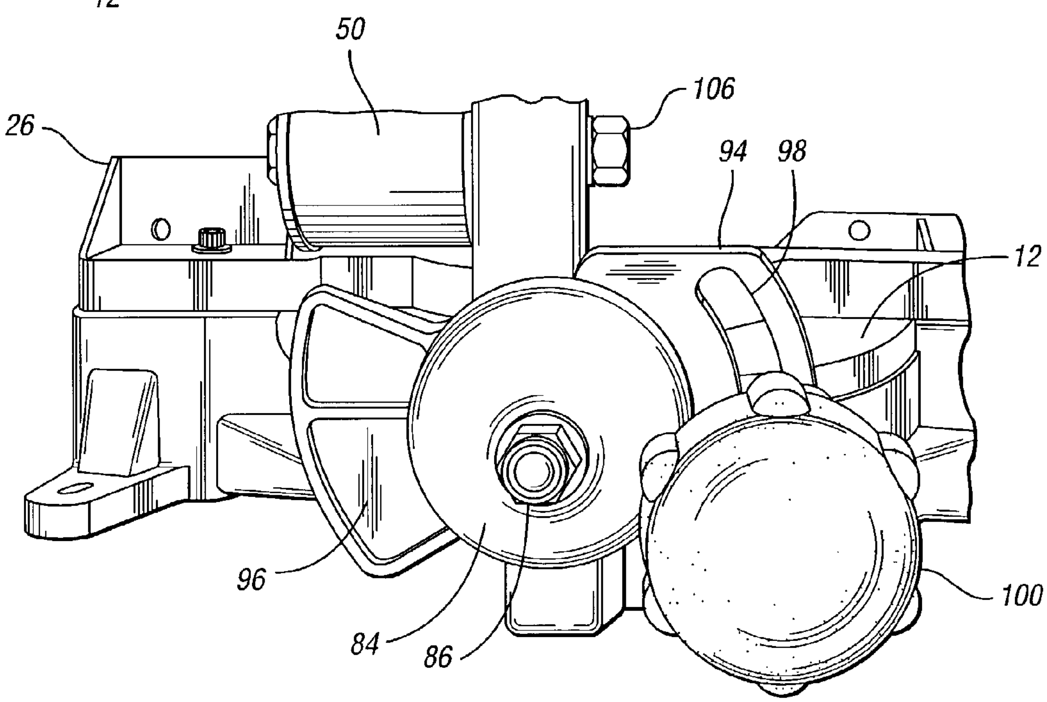
FIG. 6 is a rear plan view of the bevel adjustment mechanism of the compound miter saw of the present invention.

Referring now to FIGS. 4–6, a description of the bevel adjustment mechanism 40 of the compound miter saw 10 of the present invention is discussed in greater detail. Bevel adjustment mechanism 40 includes a first knuckle 44 permitting the saw assembly 46 to pivot about a tilt axis 48 to make bevel cuts and compound miter cuts in the workpiece and a second knuckle 50 permitting the saw assembly to rotate about pivot axis 52 to move the saw assembly 46 between an inoperative position and a cutting position. The first knuckle 44 includes a fixed portion 80 secured to the top surface 28 of turntable 14 by bolts 82, a rotating portion 84 for pivotally adjusting a saw assembly 46 about the tilt axis 48 and a bolt 86 extending through and connecting both the fixed portion 80 and rotating portion 84. The tilt axis 48 of miter saw 10 extends through the bolt provided in the center of first knuckle 44.

The fixed portion 80 of first knuckle 44 is cantilevered from the base 12 adjacent an outer edge 20. Fixed portion 80 includes an integrally formed locking flange 88 spaced radially outward of the tilt axis 48. Locking flange 88 comprises a passage 90 adapted to receive a locking mechanism 92. Rotating portion 84 includes a radially remote spaced first flange 94 and an opposing second flange 96. Remotely spaced first flange 94 includes an arcuate channel 98 corresponding to passage 90 in locking flange 88 which receives locking mechanism 92. The first knuckle includes an annular rib formed on an inner periphery of fixed portion 80, an opposing groove cooperating with the annular rib formed on the inner periphery of the rotating portion 84, and a pocket defined therebetween. A torsional spring is disposed within the pocket of the first knuckle 44 and cooperates with the annular rib and groove to control the rotation of the rotating portion 84 relative to the fixed portion 80.

Locking mechanism 92 extends through the arcuate channel 98 in flange 94 into a threaded passage 90 in locking flange 88 to secure the rotating portion 84 to the fixed portion 80. In one embodiment of the invention, locking mechanism 92 includes a knob 100 provided at a first end and a post extending from the knob terminating at a threaded portion at an opposing end. The threaded portion of locking mechanism 92 is received by the cooperating threaded passage 90 in locking flange 88. The locking mechanism 92 is disposed on the rear side of the miter saw 10 and secures rotating portion 84 to fixed portion 80 at a position along the tilt axis 48.

Figure 7:
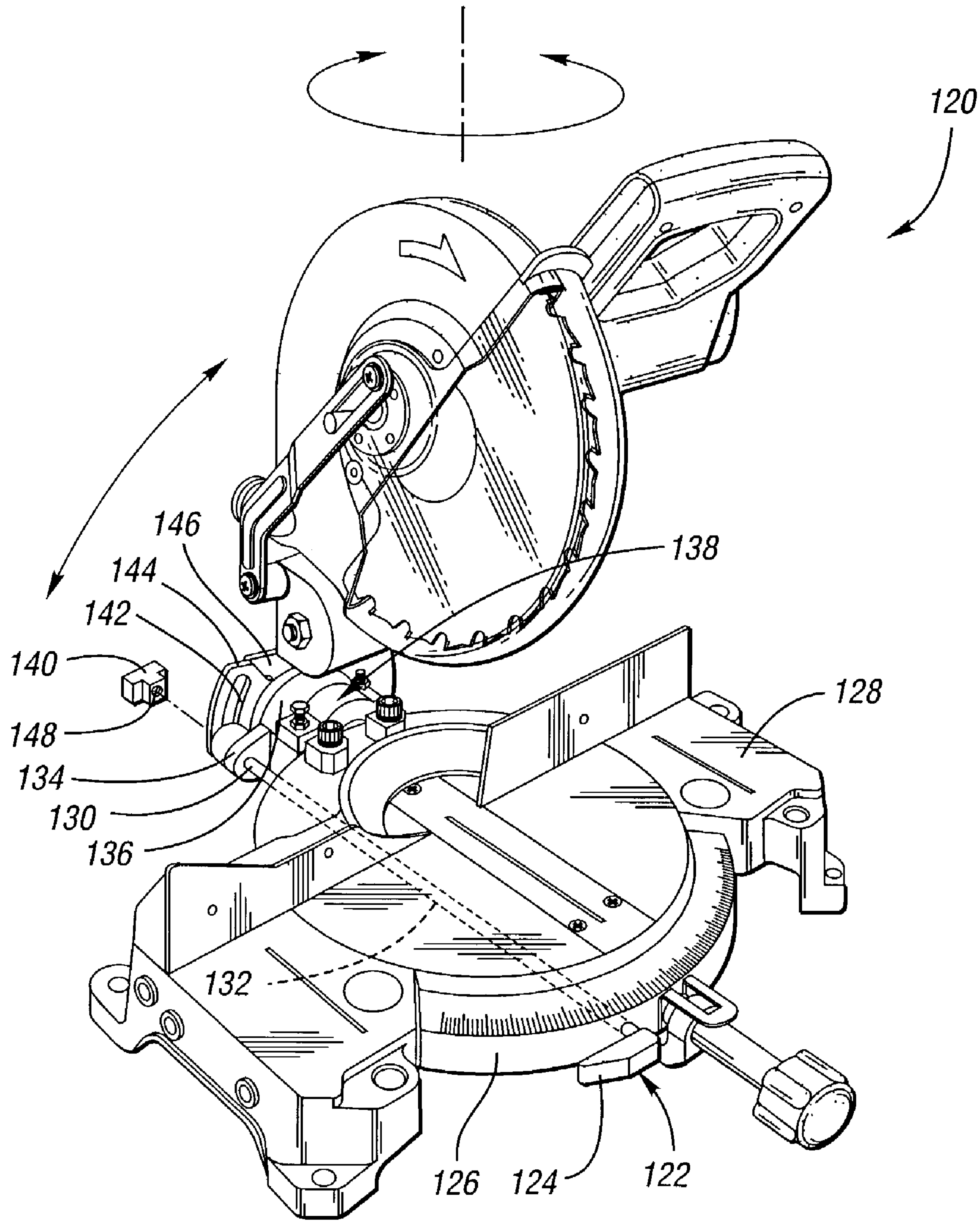
FIG. 7 is a perspective view of another embodiment of the compound miter saw of the present invention.

In an alternative embodiment of the invention illustrated in FIG. 7, compound miter saw 120 includes a locking mechanism 122 having a handle 124 provided adjacent the front edge 126 of the base 128 and a rod 13O, 132 extending be low the base 128 and through an arcuate channel 142 formed in a locking flange 134 of the fixed portion 136 of the first knuckle 138. A nut 140 provided adjacent an arcuate passage 142 on a radially remotely spaced flange 144 on a rotating portion 146 of the first knuckle 138 includes a threaded passage 148 to receive a threaded portion of rod 130. Locking mechanism 122 secures the rotating portion 146 of first knuckle 138 to the fixed portion 136 to adjustably position the rotating portion 146 relative to the fixed portion 136.

Referring back to FIGS. 4–6, second flange 96 is provided on rotating portion 84 of first knuckle 44 opposite the locking flange 88 of fixed portion 80 and first flange 94 of rotating portion 84. A scale 102 is mounted on a front face of the second flange 96. An indicator 104 is disposed on the fixed portion 80 of first knuckle 44 and cooperates with scale 102 to measure the angle of inclination of the saw blade 32 as the saw assembly 46 pivots about the tilt axis 48. The first and second flanges 94, 96 are generally in a plane perpendicular to tilt axis 48.

In operation, the saw assembly 46 is rotated about tilt axis 48 by disengaging threaded post of locking mechanism 92 from the passage 90 of locking flange 88. When disengaged, rotating portion 84 of first knuckle 44 is free to rotate about the tilt axis 48 to alter the angle of inclination of the saw blade relative to the top surface 28 of the turntable 14. The arcuate channel 98 of first flange 94 engages locking mechanism 92 at either end of the channel, restricting the rotation of the saw assembly 46 about tilt axis 48.

As the rotating portion 84 is pivoted about tilt axis 48, scale 102 on second flange 96 rotates relative to the indicator 104 on fixed portion 80 to measure the angle of inclination of the saw blade 32. Once the operator has positioned the saw assembly at the desired angle of inclination, the operator rotates locking mechanism 92. The threaded portion of the post of locking mechanism 92 engage the threaded passage 90 of locking flange 88 to draw the knob 100 of locking mechanism 92 against the flange 94. Once tightened, locking mechanism 92 forces flange 94 against locking flange 88 to secure the saw assembly in position.

Figure 8:
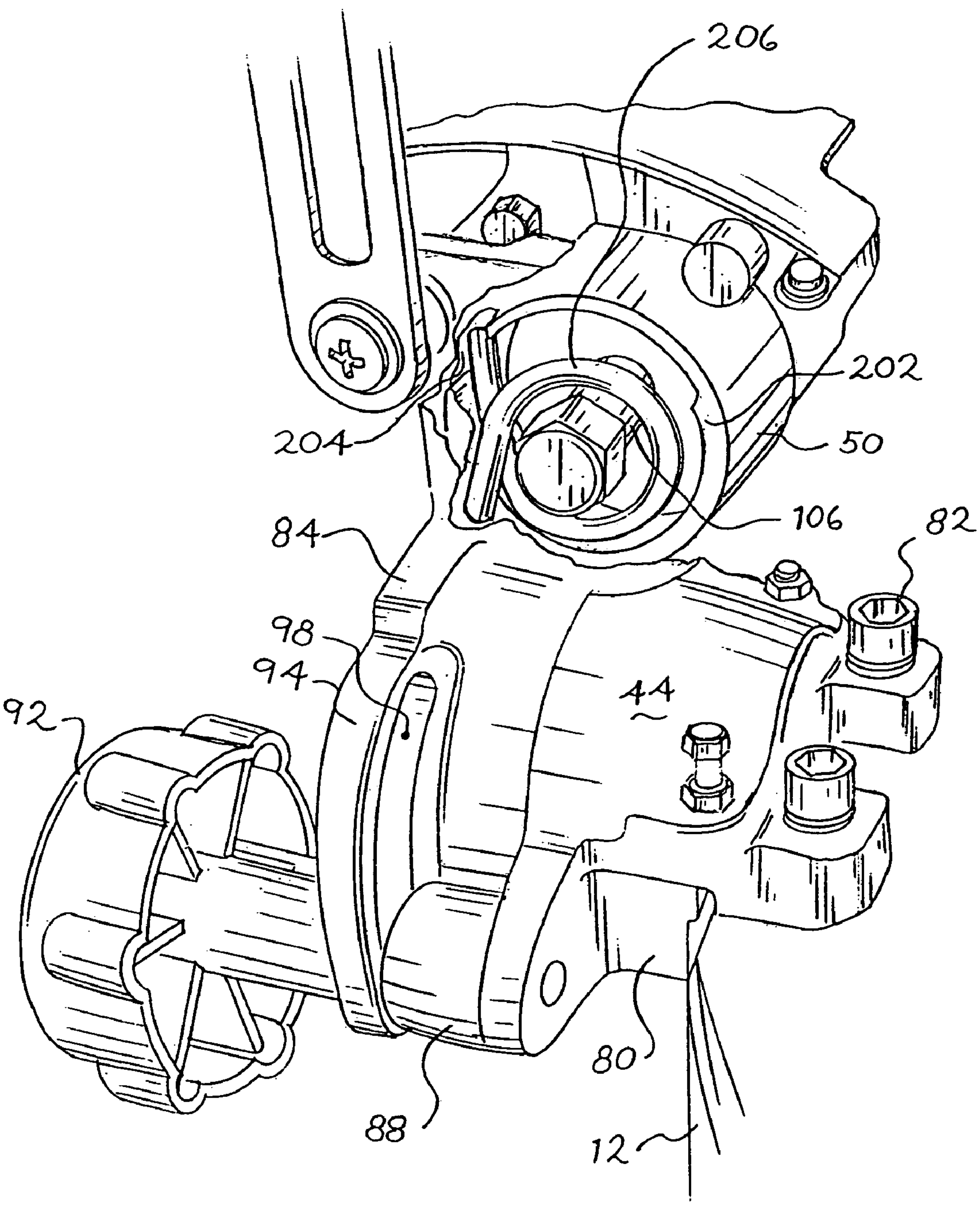
FIG. 8 is a side perspective view of the bevel adjustment mechanism of the compound miter saw of the present invention showing the internal components of the second knuckle.

A second knuckle 50 of bevel adjustment mechanism 40 allows the saw assembly to pivot between an inoperative position and a cutting position about pivot axis 52. As shown in FIG. 8, the inner periphery of the second knuckle 50 comprises an annular rib 202, a groove 204 cooperating with the annular rib 202 formed on the opposing side of the inner periphery and a pocket defined therebetween. A torsional spring 206 is disposed within the pocket of the second knuckle 50 and cooperates with the annular rib 202 and groove 204 to control the rotation of the second knuckle 50 about pivot axis 52.

A bolt 106 extends through the center of the second knuckle 50 and the fixed end 56 of elongate arm 54 of the saw assembly 46 to secure the saw assembly 46 to the bevel adjustment mechanism 40. The pivot axis 52 of saw 10 extends generally horizontally through bolt 106 in the center of the second knuckle 50 and is normally relative to the plane of the saw blade 32. The saw assembly 46 is pivotable towards and away from the top surface 28 of turntable 14 between a rest position and a cutting position. The saw assembly 46 is resiliently biased toward the inoperative position above turntable 14 by the torsional spring 206 in the second knuckle 50, requiring the operator to displace the saw assembly 46 against the force of the bias of the torsional spring 206 to move the saw assembly 46 into the cutting position.

A projection 108 provided on the front surface of the second knuckle 50 cooperates with limit stops 110, 112 on the fixed portion 80 of first knuckle 44 to restrict the travel of the saw assembly 46 about the tilt axis 48. Projection 108 is generally "V" shaped and includes a first stop portion 114 and a second stop portion 116. In the upright position shown in the Figures, a first limit stop 110 engages the bottom surface of the first stop portion 114 of projection 108. When the saw assembly is rotated about the tilt axis 48, second limit stop 112 restricts the over rotation of the saw assembly 46 by engaging the bottom surface of second stop portion 116. The height of first and second limit stops 110, 112 are adjustable to allow the operator to increase or decrease the limit angle of inclination for the saw assembly 46.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A miter saw comprising:

a. a base;

b. a turntable rotatably mounted to the base having a planar upper surface;

c. a fence assembly affixed to the base;

d. a saw assembly including an elongate arm having a fixed end pivotally attached to the turntable, a distal end forming a handle and a central region therebetween;

e. a motor assembly disposed on the elongate arm, the motor assembly including a rotary spindle supporting a cutting disk and a motor operatively connected to the rotary spindle; and f. a bevel adjustment mechanism for adjusting the angle of inclination of the cutting disk relative to the turntable upper surface, the bevel adjustment mechanism including a first knuckle for adjusting the angle of inclination of the cutting disk about a tilt axis, the first knuckle including i. a fixed portion mounted adjacent the outer periphery of the turntable and extending beyond an outer portion of the base and having a locking flange extending radially outward from the tilt axis, ii. a rotating portion cooperating with the fixed portion having first and second opposing flanges disposed in a plane generally perpendicular to the tilt axis, wherein the first flange includes an arcuate channel spaced radially outward of the tilt axis and the second flange includes a scale provided thereon cooperating with an indicator on the fixed portion to measure the angle of inclination of the saw assembly relative to the tilt axis, and iii. a locking mechanism extending through the arcuate channel in the first flange of the rotating portion into a passage formed in the locking flange of the fixed portion to secure the rotating portion to the fixed portion.

2. The miter saw of claim 1 wherein the bevel adjustment mechanism further comprises a second knuckle for pivotally adjusting the arm assembly between an inoperative position and a cutting position about a pivot axis.

3. The miter saw of claim 2 wherein the second knuckle of the bevel adjustment mechanism includes an inner periphery having an annular rib, a groove cooperating with the annular rib, and a torsional spring disposed within a pocket cooperating with the annular rib and groove to control the rotation of the second knuckle about the pivot axis.

4. The miter saw of claim 2 wherein the second knuckle includes a projection provided on the front surface having first and second stop portions cooperating with first and second limit stops provided on the fixed portion of the first knuckle to restrict the travel of the saw assembly about the tilt axis.

5. The miter saw of claim 1 wherein the locking mechanism comprises a post having a knob disposed on a first end and a threaded portion provided on the opposing second end.

6. The miter saw of claim 1 wherein the locking mechanism further comprises a handle provided adjacent a front edge of the base of the saw and a rod extending below the top surface of the base through an arcuate channel formed in a radially remotely spaced flange of the fixed portion of the first knuckle to adjustably position the rotating portion relative to the fixed portion.

7. The miter saw of claim 1 further comprising a turntable locking mechanism having a miter lock handle extending radially from one end of the turntable to lock the turntable to the base at a desired position about a generally vertical axis.

8. The miter saw of claim 7 wherein the turntable locking mechanism includes a scale provided on an outer edge of the base to measure the rotational position of the turntable about the vertical axis and an indicator provided on miter lock handle extending towards scale to display the rotational position of the turntable relative to the base on the scale.

9. The miter saw of claim 1 wherein workpiece support extensions are removably mounted to the each side of the base to support to a workpiece during the cutting operation.

10. The miter saw of claim 1 wherein a clamp is mounted on the base opposite the fence assembly to secure the workpiece in position during the cutting operation.

11. The miter saw of claim 1 wherein the handle of the saw assembly includes a motor housing having an integrally formed "D" shaped handle.

12. The miter saw of claim 1 wherein the saw assembly further comprises an upper blade guard attached to the elongate arm enclosing a portion of the cutting disk, a dust collection port integrally formed into the upper blade guard to discharge material removed from the workpiece during the cutting operation and a lower blade guard pivotally mounted to the upper blade guard by a pivot arm extending from the second knuckle, wherein the lower blade guard is retracted as the saw assembly is pivoted downward toward the turntable.

13. A compound miter saw comprising:

a. a base;

b. a turntable rotatably mounted to the base having a planar upper surface;

c. a fence assembly affixed to the base;

d. a saw assembly including an elongate arm having a fixed end pivotally attached to the turntable, a distal end forming a handle and a central region therebetween;

e. a motor assembly having a motor housing provided on the elongate arm, a rotary spindle supporting a cutting disk and a motor disposed within the motor housing operatively connected to the rotary spindle; and f. a bevel adjustment mechanism for adjusting the angle of inclination of the cutting disk relative to the turntable upper surface, the bevel adjustment mechanism including g. a first knuckle for adjusting the angle of inclination of the cutting disk about a tilt axis including a fixed portion mounted adjacent the outer periphery of the turntable and extending beyond an outer portion of the base and having a locking flange extending radially outward from the tilt axis, a rotating portion cooperating with the fixed portion having first and second opposing flanges disposed in a plane generally perpendicular to the tilt axis, wherein the first flange includes an arcuate channel spaced radially outward of the tilt axis and the second flange includes a scale provided thereon cooperating with an indicator on the fixed portion to measure the angle of inclination of the saw assembly relative to the tilt axis, and a locking mechanism extending through the arcuate channel in the first flange of the rotating portion into a passage formed in the locking flange of the fixed portion to secure the rotating portion to the fixed portion, and a second knuckle for pivotally adjusting the arm assembly between an inoperative position and a cutting position about a pivot axis, wherein the second knuckle includes an inner periphery having an annular rib, a groove cooperating with the annular rib, and a torsional spring disposed within a pocket cooperating with the annular rib and groove to control the rotation of the second knuckle about the pivot axis.

14. The compound miter saw of claim 13 wherein the locking mechanism comprises a post having a knob disposed on a first end and a threaded portion provided on the opposing second end.

15. The compound miter saw of claim 13 wherein the locking mechanism further comprises a handle provided adjacent a front edge of the base of the saw and a rod extending below the top surface of the base through an arcuate channel formed in a radially remotely spaced flange of the fixed portion of the first knuckle to adjustably position the rotating portion relative to the fixed portion.

* * * * *